United States Patent
Rakshit et al.

(10) Patent No.: US 10,747,304 B2
(45) Date of Patent: Aug. 18, 2020

(54) DEFORMATION PATTERN BASED MESSAGING

(71) Applicant: INTERNATIONAL BUSINESS MACHINES CORPORATION, Armonk, NY (US)

(72) Inventors: Sarbajit K. Rakshit, Kolkata (IN); Martin G. Keen, Cary, NC (US); John M. Ganci, Jr., Raleigh, NC (US); James E. Bostick, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 80 days.

(21) Appl. No.: 16/201,284

(22) Filed: Nov. 27, 2018

(65) Prior Publication Data
US 2020/0166989 A1     May 28, 2020

(51) Int. Cl.
*G06F 3/0488* (2013.01)
*G06F 1/16* (2006.01)
(Continued)

(52) U.S. Cl.
CPC ............... *G06F 3/011* (2013.01); *A41B 9/06* (2013.01); *A41D 1/002* (2013.01); *G06F 3/016* (2013.01);
(Continued)

(58) Field of Classification Search
CPC .......... G06F 3/011; G06F 3/016; G06F 3/017; G06F 3/03545; G06F 3/044;
(Continued)

(56) References Cited

U.S. PATENT DOCUMENTS

| 9,652,758 B2 | 5/2017 | Zhou et al. |
| 9,727,182 B2 | 8/2017 | Deokar et al. |

(Continued)

OTHER PUBLICATIONS

Nakad et al., Communications in Electronic Textile System, Proceedings of the 2003 International Conference on Communications in Computing, 2003, entire document, http://www.ccm.ece.vt.edu:8444/papers/nakad_2003_CIC03_paper.pdf, entire document.
(Continued)

*Primary Examiner* — Amare Mengistu
*Assistant Examiner* — Jennifer L Zubajlo
(74) *Attorney, Agent, or Firm* — Patrick J. Daugherty; Daugherty & Del Zoppo Co., LPA

(57) ABSTRACT

Aspects of the present invention receive line pattern data generated by a stylus point drawing a line pattern on a touch screen surface that includes a velocity value of the stylus point relative to the touch screen surface, and a pressure value exerted by the stylus point on the touch screen surface. Aspects responsively manipulate deformable fabric thread components of an e-textile clothing garment to generate a representation of the drawn line pattern from the generated line pattern data as a linear series of sequential surface deformations that exert force upon a skin surface of a person wearing the e-textile clothing in proportion to the stylus point pressure value and trace the line pattern at a tracing velocity proportionate to the velocity value of the stylus point relative to the touch screen surface.

20 Claims, 5 Drawing Sheets

(51) Int. Cl.

| | |
|---|---|
| *G06F 3/0484* | (2013.01) |
| *G06F 3/041* | (2006.01) |
| *A61H 23/02* | (2006.01) |
| *A61H 19/00* | (2006.01) |
| *H04M 1/725* | (2006.01) |
| *A41D 1/00* | (2018.01) |
| *A61H 7/00* | (2006.01) |
| *G08C 17/02* | (2006.01) |
| *G06F 3/01* | (2006.01) |
| *G06N 20/00* | (2019.01) |
| *G06F 3/0354* | (2013.01) |
| *A41B 9/06* | (2006.01) |
| *H04L 29/08* | (2006.01) |

(52) U.S. Cl.
CPC .......... *G06F 3/017* (2013.01); *G06F 3/03545* (2013.01); *G06F 3/04883* (2013.01); *G06N 20/00* (2019.01); *H04L 67/10* (2013.01)

(58) Field of Classification Search
CPC ....... G06F 3/04883; G06F 1/163; A41B 9/06; A41D 1/002; A61B 5/0002; A61B 5/6804; A61H 19/30; D02G 3/441; G09G 5/006; H04L 67/10
See application file for complete search history.

(56) References Cited

U.S. PATENT DOCUMENTS

| | | | |
|---|---|---|---|
| 2012/0218090 | A1 | 8/2012 | Rothschild |
| 2013/0328783 | A1* | 12/2013 | Martin ................. G09G 5/006 345/169 |
| 2014/0070957 | A1 | 3/2014 | Longinotti-Buitoni |
| 2014/0318699 | A1* | 10/2014 | Longinotti-Buitoni ..................... A61B 5/0002 156/247 |
| 2017/0115777 | A1* | 4/2017 | Poupyrev ................ G06F 3/044 |
| 2017/0196513 | A1* | 7/2017 | Longinotti-Buitoni ..................... A61B 5/6804 |
| 2017/0249033 | A1* | 8/2017 | Podhajny ............... D03D 15/00 |
| 2018/0243163 | A1* | 8/2018 | Choudhury ............ G06F 1/163 |
| 2018/0258562 | A1* | 9/2018 | Fukuhara ............... D02G 3/441 |
| 2019/0132948 | A1* | 5/2019 | Longinotti-Buitoni ..................... A61B 5/6804 |
| 2020/0078260 | A1* | 3/2020 | Choudhury ............ A61H 19/30 |

OTHER PUBLICATIONS

Zheng et al., A Dependable Communication Network for e-Textiles, ICCS 2006, 2006, entire document, part IV, LNCS 3994, http://link.springer.com/chapter/10.1007/11758549_125, entire document.

Peter Mell et al, The NIST Definition of Cloud Computing, National Institute of Standards and Technology, Publication 800-145, 2011, entire document.

* cited by examiner

DEFORMATION PATTERN BASED MESSAGING

TECHNICAL FIELD

The present invention relates generally to a method, system, and computer program product for controlling electronic textiles. More particularly, the present invention relates to a method, system, and computer program product for generating electronic textile configurations in response to user inputs.

BACKGROUND

Electronic textiles, also known as e-textiles, smart garments, smart clothing, smart textiles, or e-fabrics or smart fabrics, incorporate deformable materials in communication with small computers, programmable devices, electronics, and mechanical and power components. Smart textiles may accomplish a variety of tasks and functions via material deformations or other transformations in response to electrical or mechanical forces or inputs, providing fabrics that light up, change color, and gather energy from the environment by harnessing vibrations, sound or heat. Performance enhancing smart textiles include fabrics designed to regulate body temperature, reduce wind resistance, control muscle vibration, guard against extreme environmental hazards (such as radiation and toxins) and release topical skin treatments (pharmaceuticals, moisturizers, perfume, etc.)

BRIEF SUMMARY

In one aspect of the present invention, a method includes receiving line pattern data generated in response to a stylus point drawing a line pattern on a touch screen surface of a graphical user interface device, wherein the generated line pattern data includes a velocity value of the stylus point relative to the touch screen surface, and a pressure value exerted by the stylus point on the touch screen surface; and manipulating deformable fabric thread components of an e-textile clothing garment to generate a representation of the drawn line pattern of the received, generated line pattern data as a linear series of sequential surface deformations that exert force upon a skin surface of a person wearing the e-textile clothing garment, wherein the surface deformations exert force upon the skin surface in proportion to the pressure value exerted by the stylus point on the touch screen surface and trace the line pattern at a tracing velocity that is proportionate to the velocity value of the stylus point relative to the touch screen surface.

In another aspect, a computer system has a hardware computer processor, computer readable memory in circuit communication with the computer processor, and a computer-readable storage medium in circuit communication with the computer processor and having program instructions stored thereon. The computer processor executes the program instructions stored on the computer-readable storage medium via the computer readable memory and thereby receives line pattern data generated in response to a stylus point drawing a line pattern on a touch screen surface of a graphical user interface device, wherein the generated line pattern data includes a velocity value of the stylus point relative to the touch screen surface, and a pressure value exerted by the stylus point on the touch screen surface; and manipulates deformable fabric thread components of an e-textile clothing garment to generate a representation of the drawn line pattern of the received, generated line pattern data as a linear series of sequential surface deformations that exert force upon a skin surface of a person wearing the e-textile clothing garment, wherein the surface deformations exert force upon the skin surface in proportion to the pressure value exerted by the stylus point on the touch screen surface and trace the line pattern at a tracing velocity that is proportionate to the velocity value of the stylus point relative to the touch screen surface.

In another aspect, a computer program product has a computer-readable storage medium with computer readable program code embodied therewith. The computer readable program code includes instructions for execution by a computer processor that cause the computer processor to receive line pattern data generated in response to a stylus point drawing a line pattern on a touch screen surface of a graphical user interface device, wherein the generated line pattern data includes a velocity value of the stylus point relative to the touch screen surface, and a pressure value exerted by the stylus point on the touch screen surface; and manipulates deformable fabric thread components of an e-textile clothing garment to generate a representation of the drawn line pattern of the received, generated line pattern data as a linear series of sequential surface deformations that exert force upon a skin surface of a person wearing the e-textile clothing garment, wherein the surface deformations exert force upon the skin surface in proportion to the pressure value exerted by the stylus point on the touch screen surface and trace the line pattern at a tracing velocity that is proportionate to the velocity value of the stylus point relative to the touch screen surface.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
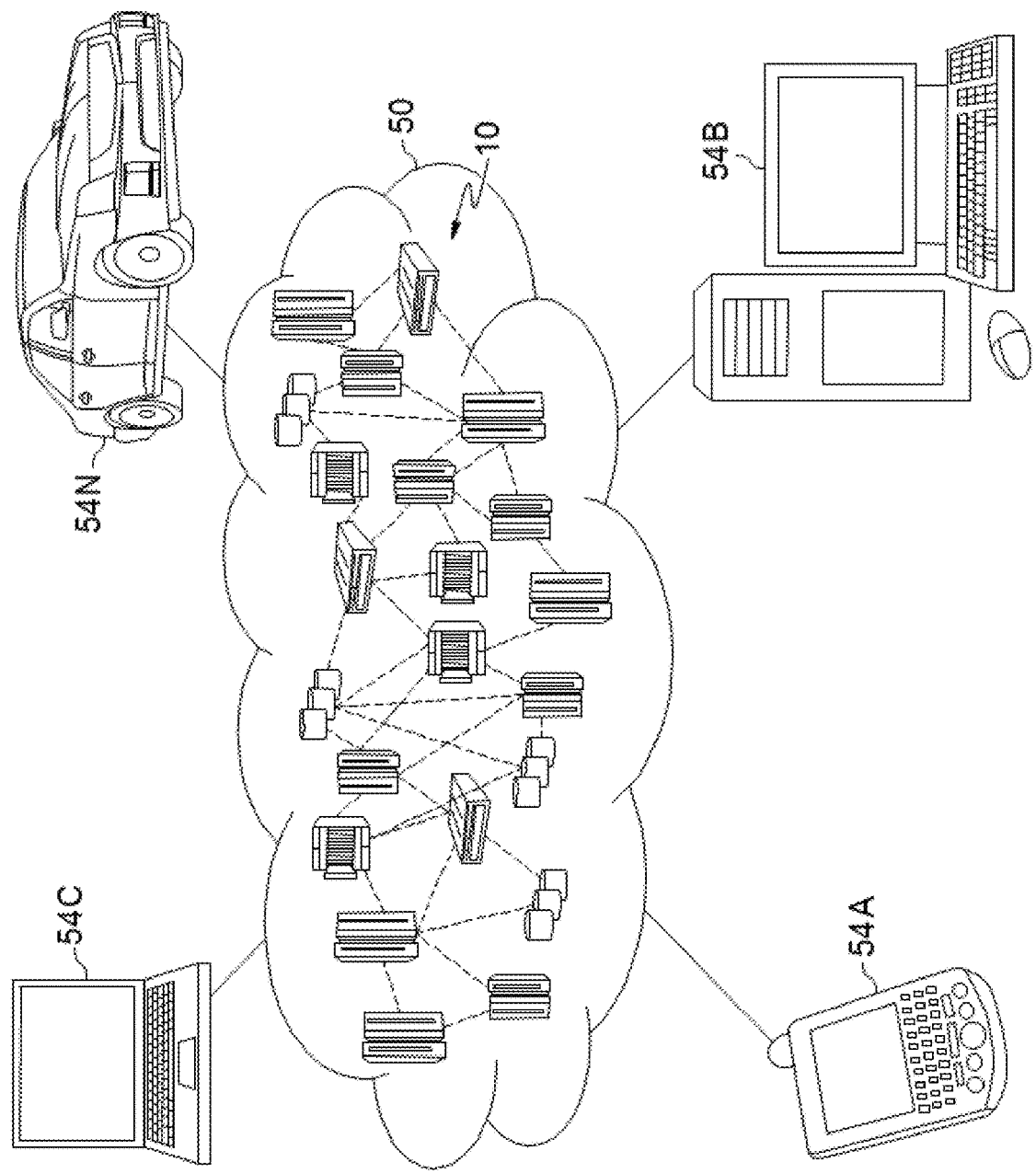
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and be rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
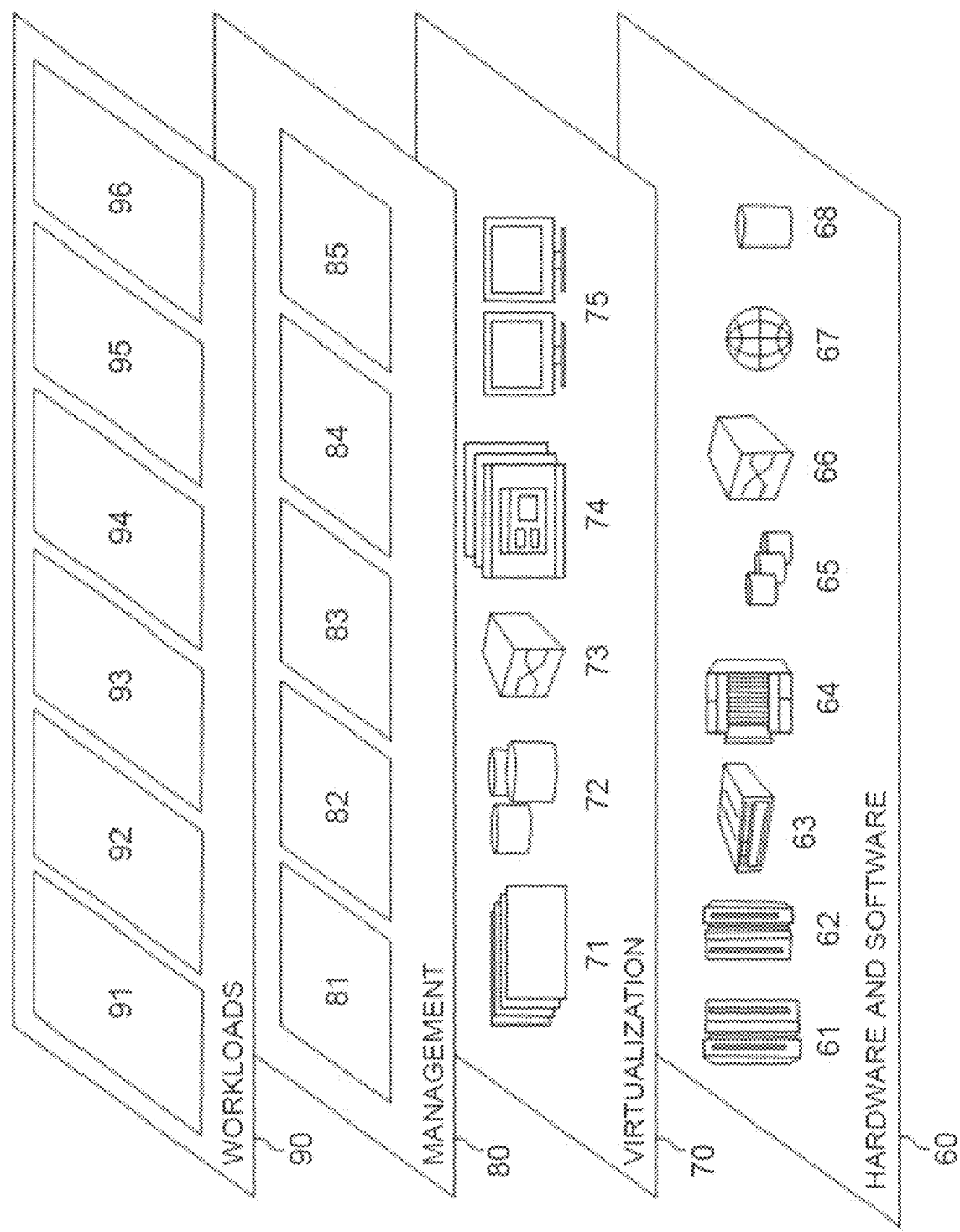
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing for message communication through deformation patterns on e-textile garments according to aspects of the present invention 96.

Figure 3:
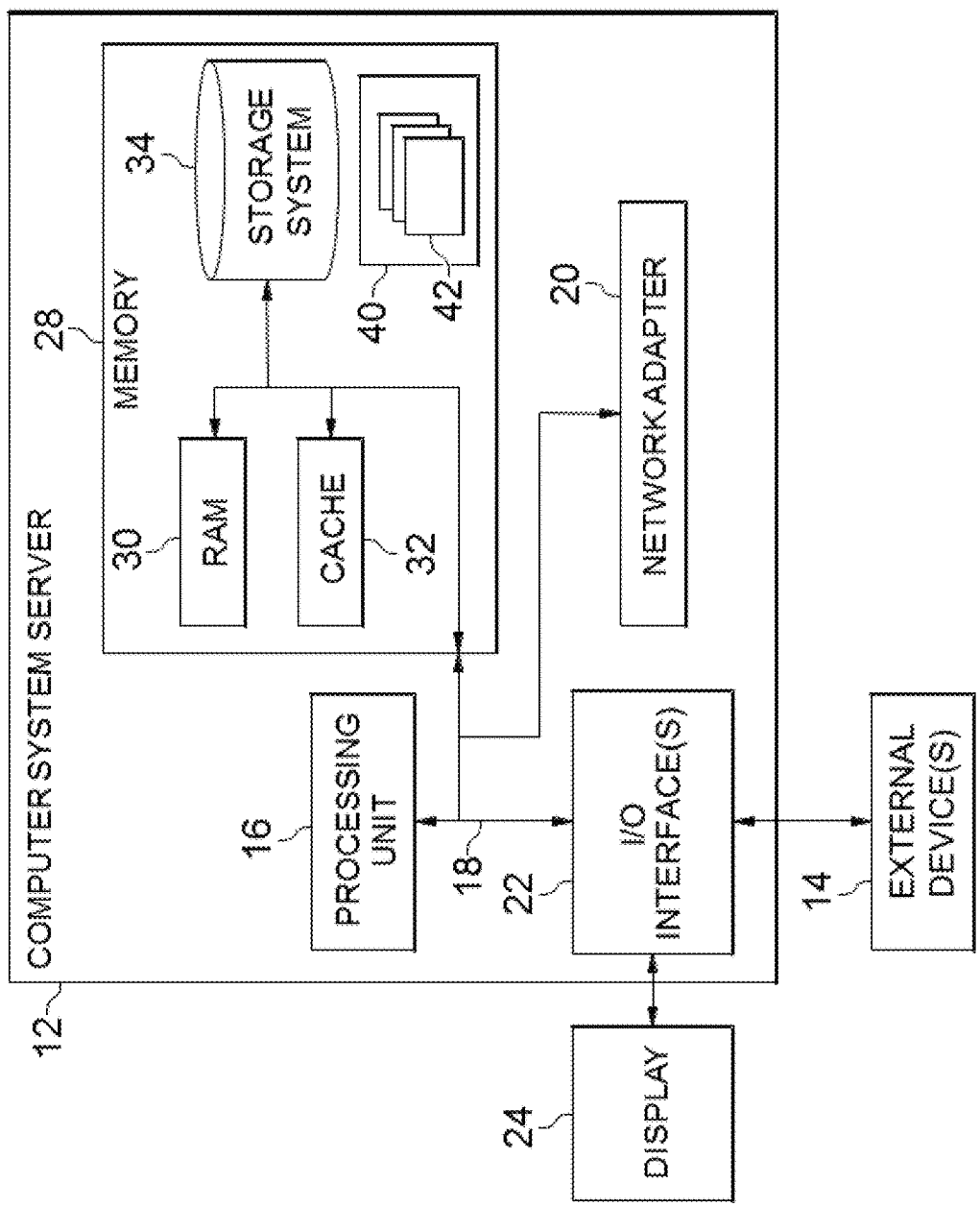
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 4:
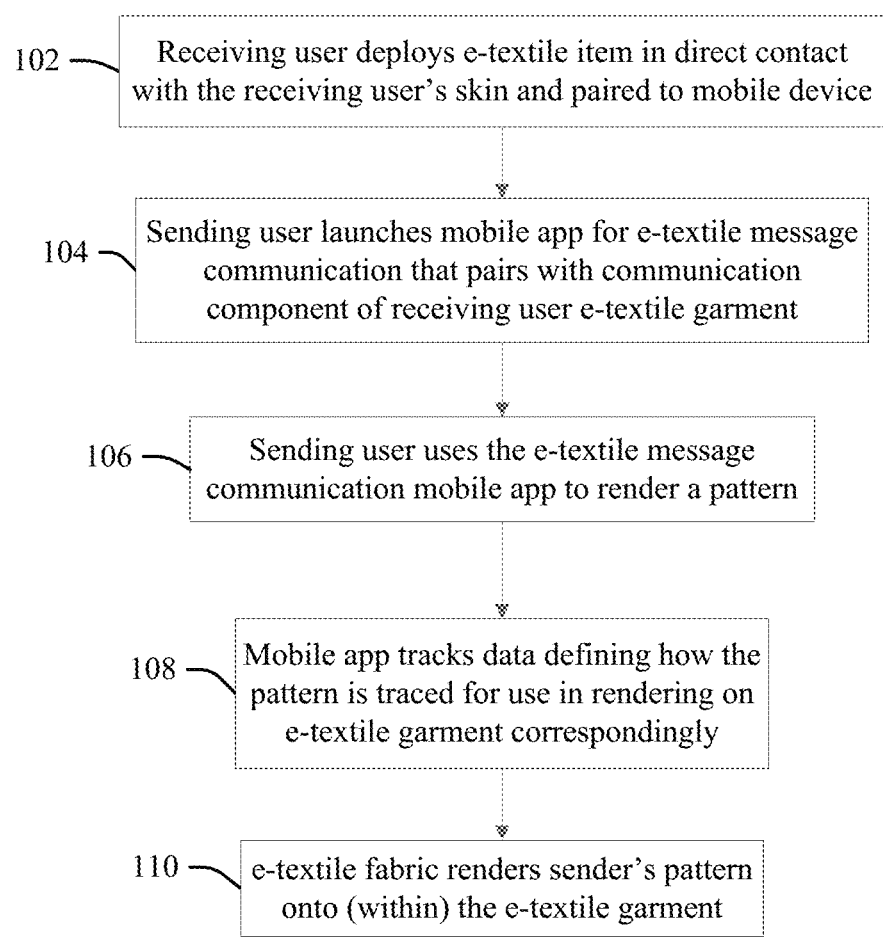
FIG. 4 is a block diagram illustration of an embodiment of the present invention.

FIG. 4 illustrates an embodiment of the present invention. At 102 a receiving user deploys (wears) an item of e-textile clothing in direct contact with the receiving user's skin. Illustrative but not limiting or exhaustive examples include form-fitting clothing such as a tailored shirt, a wrist band, socks, and so forth, which will provide a maximum sensation for the receiving user to experience rendering of sent messages.

The e-textile clothing is paired to a programmable device configured to receive messages or other data, such as a receiving user's smart phone or smart-watch. This paring can be accomplished via a wireless communication connection or other Personal Area Network (PAN) connection. Thus, the programmable device acts as an interface to the e-textile for sending and receiving information, and for driving the e-textile to deform, as described below.

At 104 a sending user launches a mobile app for e-textile message communication. that pairs with the communication component built into the receiving user e-textile garment, for example using wireless communication components and protocols.

At 106 the sending user uses the e-textile message communication mobile app to generate or render a pattern or message which will be sent to the e-textile-wearing recipient. A pattern is generally a regularity in which elements of a pattern repeat in a predictable manner. A geometric pattern is a kind of pattern formed of geometric shapes and typically repeated, like a wallpaper design. Patterns may have or be described by an underlying mathematical structure, wherein the pattern may be defined and created and replicated through processing mathematical values through appropriate algorithms. Mathematics generally involves a search for regularities or pattern, and the output of any function is a mathematical pattern.

In some embodiments, the sender uses a stylus or their finger to trace this pattern or message onto the screen of their smart phone. The mobile application gathers data related not only to the shape of the pattern or message, but also information relating to the velocity, pressure, and order of the movements traced onto the screen. The sender will specify a location on the e-textile where they want the message to be rendered. This information is transmitted to the receiver's smart phone via cellular data network or over Wi-Fi, and then transmitted to the e-textile garment using the receiving user's wireless communication network.

Thus, at 108 the mobile app tracks data defining how the pattern is traced so that the message can be rendered on the e-textile garment in the same way. Illustrative but not limiting or exhaustive examples of data the mobile app records include:

Velocity: for example, how fast/slow each component of the message was traced.

Pressure: the varying levels of pressure in forming the message are recorded. In some examples the mobile device can determine, and record applied pressure via the touch features on graphical user interface GUI) smart phone touch screens that distinguish between different pressure inputs.

Location: the locations on an e-textile garment where the message should be rendered.

Accordingly, the pattern and the way in which it was constructed (velocity, pressure, location) at 106 are sent over the paired connection and received by the e-textile garment, wherein at 110 the e-textile garment renders (traces) and thereby recreates the sender's pattern or a representation thereof, for example, by utilizing electro-active polymer threads that deform into an equivalent pattern and thereby create a sensation on body portions in contact with the deformed areas of a moving, local deformation tracing pattern that the user can feel moving across their skin. This deformation may be confidential and not clearly visible to observers. The message is generally received by the e-textile garment communication component and rendered onto the e-textile garment, conveying velocity, pressure, and location data to a user wearing the garment via skin or other body contact. The e-textile garment traces the message utilizing electro-active polymer threads.

In lieu of constructing a particular pattern at 106, with associated data at 108, the sender can also generate a sensation on a particular location on an the receiver's e-textile garment, which can be used for communication, in response to specified outputs. For example, a deformation may be generated on the center of the receiver's back at 108 in response to a "No" input that the sender dictated into a message application window, and a different deformation form and location at a different specified area (for example, at front-center or torso, or right arm vs left arm) in response to a "Yes" content input. Thus, body areas may be broken-up into areas that embodiments map to different specific patterns or words, in some aspects that the receiver and/or sender learn in advance.

Figure 5A:
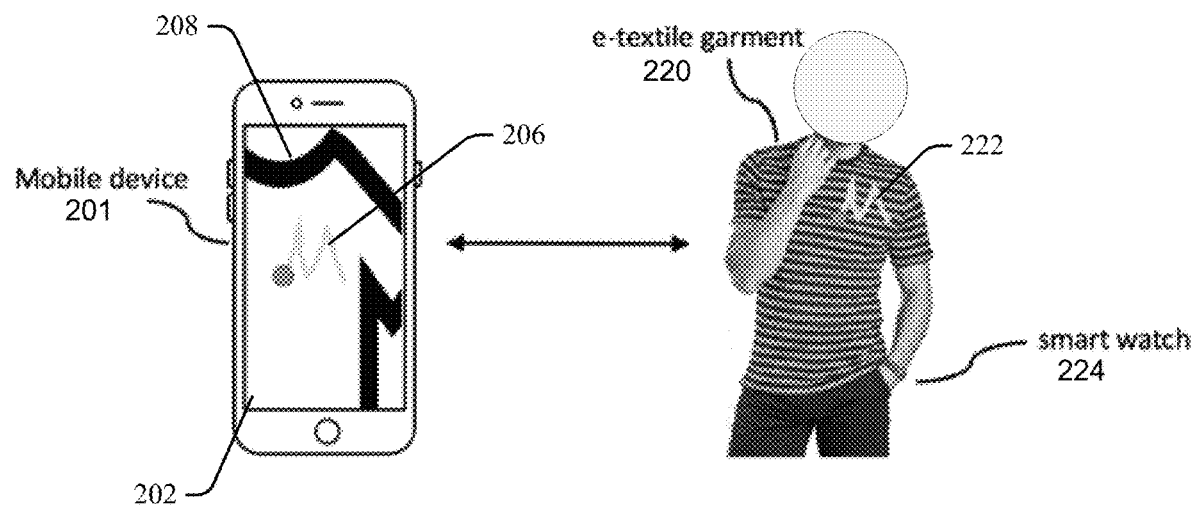
FIGS. 5A and 5B provide graphic illustrations of aspects of the present invention.

With reference now to FIG. 5A, in one example a mobile app according to the present invention executing on the sender's smart phone 201 enables the sender to draw a stylized "M" design 206 on a touch screen surface 202 of the phone 201, which is plotted within an image 208 of the receiver's e-fabric shirt on a specific area of the shirt (the top right corner of a shirt outline, which corresponds to an upper-left area when worn by the receiving user.

In response to receiving the design 206, the e-fabric of the e-textile shirt (garment) 220 worn by the receiver forms a corresponding version 222 of the stylized "M" design, located in corresponding upper-left area to that mapped within the screen rendering of the shirt 208.

Figure 5B:
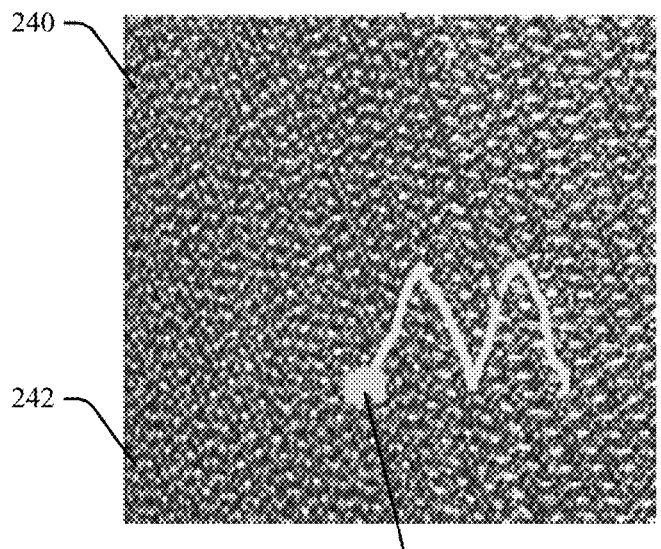

FIG. 5B provides a zoomed-in, detail view 240 of the portion of the e-textile shirt (garment) 220 and the corresponding version 222, wherein texture patterns 242 of the e-fabric of the e-textile shirt (garment) 220 are apparent.

Embodiments may render the stylized "M" design 222 with the same or similar speed and pressure used to enter the design 206 on the smart phone screen 202, for example, slowly and with extra pressure on the last stroke, wherein this is replicated on the e-textile shirt by tracing this pattern consistent with how it was created. For example, local deformation may be created on the e-textile shirt fabric 220 via an electroactive polymer that conveys a pressure sensation to the receiving user wearing the e-textile shirt 220 that is equal to or proportional or otherwise representative of input pressure conveyed to the screen 202 by movement of the user finger or a stylus in creating the input design 206. This creates a sensation of a moving local deformation, creating a pattern that the user can feel moving across their clothing. The user will be able to detect the movement of the deformation to observe the pattern being formed.

E-textile clothing fabric may comprise electro-active polymer threads that deform when an electrical field is applied. In some embodiments, electro-active polymer threads are controlled by a token bus grid regulating electrical current to the fibers, wherein activation of different token busses causes the electro-active polymer threads to form a deformation in the surface of the fabric, which the receiving user feels are pressure contact on their skin. In some e-textile garments embedded semi-conductor chips may be driven by signals to create local, surrounding electric fields around the semi-conductor chip, resulting in corresponding local deformations of surrounding electro-active polymer threads in an amount that is felt by a user when the threads are in contact with the user's skin.

Thus, embodiment e-textile clothing garments are ideally in direct contact with the receiving user's skin. Form-fitting clothing (for example, a tailored shirt, a wrist band, socks, an undershirt, etc.) generally provide more optimal sensation attributes for receiving messages via the perception of surface deformations from electronic textile surfaces in contact with a skin surface of a person wearing the textile, relative to other looser or over-garments.

Embodiments further incorporate gesture communication components for the use of the receiver that enables two-way communication between e-textile clothing or wearer thereof and the sender's mobile device or other device. For example, a user can define specific gestures that are recorded by the movement sensors accelerometer and gyroscope, etc.) of a smart watch 224 shown in FIG. 5A. These gestures may include subtle movements that are unlikely to be noticed by observers, but have pre-defined meanings to users wearing or viewing the garments.

More particularly, the receiver may signal that they have received the message by performing gestures with smartwatch or other device that is configured to determine motion or gesture data. Some embodiments determine whether the person recognized message content associated to the rendered pattern as a function of matching captured gesture pattern data to a gesture pattern labeled within a trained data set of gesture patterns. Embodiments enable receivers and senders of e-textile messaging deformations to generate and send message signals that are transformed from gestures and other motions captured by motion sensors. Embodiments may condition motion signal capture or translation into messaging content upon consent of the user from whom the motion data is obtained, and users may generally opt-out of such functionality at any time.

For example, in one embodiment the receiver signals that the message has been recognized or understood by slightly raising their wrist, wherein the accelerometer, gyroscope, and/or other motion sensors in the smartwatch detect this wrist movement, which matches gesture data labeled within a trained data set of gesture patterns as an "understood" gesture pattern. This information is communicated via wireless communication to the receiver's smartphone, wherein the e-textile reproduces the sender's message information by creating a moving deformation in the fabric that mimics the shape, velocity, pressure, and location of the sender's message.

Via feedback from the two-way communication exchange of gestures and new pattern generation, the pattern may be revised in an iterative loop until the receiver signals that they have received and understood the message. For example, if the receiver signals via negative wrist gesture that the message has not been understood, several pre-configured actions are available. In one embodiment, the smart phone receives the "not understood" gesture from the smartwatch and subsequently increases the deformation pattern pressure being sent to the e-textile. In another embodiment the velocity of the pattern tracing is slowed down. In another embodiment the location on the e-textile is changed until the "message-received" gesture is communicated from the smartwatch.

Embodiments of the present invention include a cognitive system which learns over time how to optimally present a deformation pattern to the receiving user. The cognitive system considers the receiving user's history of responses to learn the most effect location, speed, and pressure when rendering deformation patterns. As noted above, in response to two-communications deformation patterns may also be repeated in a loop. Via comparing multiple loop iterations, the cognitive system user can (better) recognize good pattern replication values for use in forming future patterns.

Embodiments may self-learn local deformation patterns. For example, a cognitive system tracks deformation patterns and their velocity, pressure and location. The system also tracks a receiving user's response to these patterns through gestures captured by a smart watch. Over time the system learns what types of deformation patterns the receiving user can recognize in a variety of conditions. The system may learn, for example, that a deformation pattern applied to the front of a shirt needs to exhibit higher deformation to be recognized than a deformation on the shoulder of a tight-fitting shirt garment. By considering the pattern being formed, it's location, and other contributing factors, embodiments self-learn how to best create deformation patterns that the user will be able to recognize with minimal repeating of the pattern. This ensures that future pattern deformations are more tailored to a user's sensitivity to detect them.

Embodiments thus enable mobile and other message communication through deformation patterns on e-textile garments. Further, by exchanging messages from a mobile device onto an e-textile item of clothing whereby the e-textile clothing creates a sensation on a user's skin representing a deformation pattern, such messages may only be discernible to the wearer of the clothing, enabling confidential and secure communication between sender and receiver that is not perceivable, and thus is undetectable, to nearby observers, as they lack the tactile information conveyed to the wearer of the garment. Embodiments utilize e-textiles as a communication platform whereby a sender and receiver can exchange a message without any audible cues (no sound is used) or visual cues (the receiver does not look at a mobile device to receive the message).

Such discrete and flexible communication mechanisms provide advantages over prior art forms of electronic messaging, such as those that involve reception of message content on a mobile device. To retrieve the message a user must look down at their mobile phone screen or glance at their smart watch. There are many situations when this is inappropriate; for example, during an in-person meeting, glancing at a smart watch or phone screen would be considered inappropriate if another person is talking. It is also difficult to confidentially communicate with a receiver without anybody else knowing of the communication.

Embodiments enable a variety of forms of communication that are achieved by forming patterns on an e-textile garment that creates a sensation on the wearer's skin. Patterns are traced or generated in such a way as to mirror the velocity, pressure, and location of an original pattern drawn on a mobile device or other device onto (within) the e-textile garment. A message sender creates a pattern on a mobile device and the e-textile garment wearer can feel with pattern traced onto their skin. This enables a confidential communication between the two parties that is not visible or audible to nearby observers. Subtle smart watch gestures are used to communicate back to the sender when the message has been received and understood.

Through feedback processes embodiments exhibits self-learning over time of local deformation pattern values (pressure, velocity, depth, strength, frequency, location, etc.) wherein future pattern deformations are tailored to a user's sensitivity to detect them (for example, choosing the values that the user indicates are best felt and useful in conveying meaningful patterns). Thus, embodiments combine a mobile device and e-textile garment with electro-active polymer threads to trace a pattern drawn on a mobile device onto the e-textile garment through local deformations of threads in the garment, wherein the user can feel the tracing of this pattern against their skin and recognize the pattern being formed.

The terminology used herein is for describing aspects only and is not intended to be limiting of the invention. As used herein, singular forms "a", "an", and "the" are intended to include the plural forms as well, unless the context clearly indicates otherwise. It will be further understood that the terms "include" and "including" when used in the specification specify the presence of stated features, integers, steps, operations, elements, and/or groups thereof. Certain examples and elements described in the present specification, including in the claims, and as illustrated in the figures, may be distinguished, or otherwise identified from others by unique adjectives (e.g. a "first" element distinguished from a "second" or "third" of a plurality of elements, a "primary" distinguished from a "secondary" one or "another" item, etc.) Such identifying adjectives are generally used to reduce confusion or uncertainty and are not to be construed to limit the claims to any specific illustrated element or embodiment, or to imply and precedence, ordering, or ranking of any certain elements, limitations, or process steps.

The descriptions of the various embodiments of the present invention have been presented for the purposes of illustration but are not intended to be exhaustive or limited to the embodiments disclosed. Many modifications and variations will be apparent to those of ordinary skill in the art without departing for the scope and spirit of the described embodiments. The terminology used herein was chosen to best explain the principles of the embodiments, the practical applications or technical improvement over technologies found in the marketplace, or to enable others of ordinary skill in the art to understand the embodiments disclosed herein.

What is claimed is:

1. A computer-implemented method, comprising:
   receiving line pattern data generated in response to a stylus point drawing a line pattern on a touch screen surface of a graphical user interface device, wherein the generated line pattern data comprises a velocity value of the stylus point relative to the touch screen surface, and a pressure value exerted by the stylus point on the touch screen surface; and
   manipulating deformable fabric thread components of an e-textile clothing garment to generate a representation of the drawn line pattern of the received, generated line pattern data as a linear series of sequential surface deformations that exert force upon a skin surface of a person wearing the e-textile clothing garment, wherein the surface deformations exert force upon the skin surface in proportion to the pressure value exerted by the stylus point on the touch screen surface and trace the line pattern at a tracing velocity that is proportionate to the velocity value of the stylus point relative to the touch screen surface.

2. The method of claim 1, wherein the generated line pattern data comprises location data of the line pattern relative to a surface area of the an e-textile clothing garment that is represented within the touch screen surface, the method further comprising:
   manipulating the deformable fabric thread components to generate the linear series of sequential surface deformations at a location of the e-textile clothing garment that corresponds to the surface area represented within the touch screen surface.

3. The method of claim 2, wherein the manipulating the deformable fabric thread components comprises:
   causing a plurality of electro-active polymer threads to form deformations in a surface of an e-textile clothing garment fabric that define the linear series of sequential surface deformations.

4. The method of claim 2, further comprising:
   capturing, via motion sensors, gesture pattern data representing gesture motions by the person wearing the e-textile clothing garment that are generated subsequent to the manipulating the deformable fabric thread components to generate the representation of the drawn line pattern as the linear series of sequential surface deformations; and
   determining whether the person wearing the e-textile clothing garment recognized message content associated to the drawn line pattern as a function of matching the captured gesture pattern data to a gesture pattern labeled within a trained data set of gesture patterns.

5. The method of claim 4, further comprising:
   learning optimal proportionate values for the force exerted by the surface deformations upon the skin surface, and for the tracing velocity, as a function of association to historic gesture pattern responses by the person wearing the e-textile clothing garment that are determined to indicate that the person recognized the message content associated to the drawn line pattern.

6. The method of claim 5, further comprising:
   learning different optimal proportionate values for the force exerted by the surface deformations upon the skin surface at different locations of the deformable fabric thread components of an e-textile clothing garment that are correlated to different portions of the body of the person wearing the e-textile clothing garment.

7. The method of claim 1, further comprising:
   integrating computer-readable program code into a computer system comprising a processor, a computer readable memory in circuit communication with the processor, and a computer readable storage medium in circuit communication with the processor; and
   wherein the processor executes program code instructions stored on the computer readable storage medium via the computer readable memory and thereby performs the receiving the line pattern data, and the manipulating the deformable fabric thread components of an e-textile clothing garment to generate the representation of the drawn line pattern.

8. The method of claim 7, wherein the computer-readable program code is provided as a service in a cloud environment.

9. A computer system, comprising:
   a computer processor;
   a computer readable memory in circuit communication with the computer processor; and
   a computer readable storage medium in circuit communication with the computer processor;
   wherein the computer processor executes program instructions stored on the computer readable storage medium via the computer readable memory and thereby:
   receives line pattern data generated in response to a stylus point drawing a line pattern on a touch screen surface of a graphical user interface device, wherein the generated line pattern data comprises a velocity value of the stylus point relative to the touch screen surface, and a pressure value exerted by the stylus point on the touch screen surface; and
   manipulates deformable fabric thread components of an e-textile clothing garment to generate a representation of the drawn line pattern of the received, generated line pattern data as a linear series of sequential surface deformations that exert force upon a skin surface of a person wearing the e-textile clothing garment, wherein the surface deformations exert force upon the skin surface in proportion to the pressure value exerted by the stylus point on the touch screen surface and trace the line pattern at a tracing velocity that is proportionate to the velocity value of the stylus point relative to the touch screen surface.

10. The system of claim 9, wherein the generated line pattern data comprises location data of the line pattern relative to a surface area of the an e-textile clothing garment that is represented within the touch screen surface, and wherein the processor executes program instructions stored on the computer readable storage medium via the computer readable memory and thereby:
 manipulates the deformable fabric thread components to generate the linear series of sequential surface deformations at location of the e-textile clothing garment that corresponds to the surface area represented within the touch screen surface.

11. The system of claim 10, wherein the processor executes program instructions stored on the computer readable storage medium via the computer readable memory and thereby:
 causes a plurality of electro-active polymer threads to form deformations in a surface of an e-textile clothing garment fabric that define the linear series of sequential surface deformations.

12. The system of claim 10, wherein the processor executes program instructions stored on the computer readable storage medium via the computer readable memory and thereby:
 captures, via motion sensors, gesture pattern data representing gesture motions by the person wearing the e-textile clothing garment that are generated subsequent to the manipulating the deformable fabric thread components to generate the representation of the drawn line pattern as the linear series of sequential surface deformations; and
 determines whether the person recognized message content associated to the drawn line pattern as a function of matching the captured gesture pattern data to a gesture pattern labeled within a trained data set of gesture patterns.

13. The system of claim 12, wherein the processor executes program instructions stored on the computer readable storage medium via the computer readable memory and thereby:
 learning optimal proportionate values for the force exerted by the surface deformations upon the skin surface, and for the tracing velocity, as a function of association to historic gesture pattern responses by the person that are determined to indicate that the person recognized the message content associated to the drawn line pattern.

14. The system of claim 13, wherein the processor executes program instructions stored on the computer readable storage medium via the computer readable memory and thereby:
 learns different optimal proportionate values for the force exerted by the surface deformations upon the skin surface at different locations of the deformable fabric thread components of an e-textile clothing garment that are correlated to different portions of the body of the person wearing the e-textile clothing garment.

15. A computer program product, comprising:
 a computer readable storage medium having computer readable program code embodied therewith, the computer readable program code comprising instructions for execution by a computer processor that causes the computer processor to:
 receive line pattern data generated in response to a stylus point drawing a line pattern on a touch screen surface of a graphical user interface device, wherein the generated line pattern data comprises a velocity value of the stylus point relative to the touch screen surface, and a pressure value exerted by the stylus point on the touch screen surface; and
 manipulate deformable fabric thread components of an e-textile clothing garment to generate a representation of the drawn line pattern of the received, generated line pattern data as a linear series of sequential surface deformations that exert force upon a skin surface of a person wearing the e-textile clothing garment, wherein the surface deformations exert force upon the skin surface in proportion to the pressure value exerted by the stylus point on the touch screen surface and trace the line pattern at a tracing velocity that is proportionate to the velocity value of the stylus point relative to the touch screen surface.

16. The computer program product of claim 15, wherein the generated line pattern data comprises location data of the line pattern relative to a surface area of the an e-textile clothing garment that is represented within the touch screen surface, and wherein the instructions for execution cause the computer processor to:
 manipulate the deformable fabric thread components to generate the linear series of sequential surface deformations at a location of the e-textile clothing garment that corresponds to the surface area represented within the touch screen surface.

17. The computer program product of claim 16, wherein the instructions for execution cause the computer processor to:
 cause a plurality of electro-active polymer threads to form deformations in a surface of an e-textile clothing garment fabric that define the linear series of sequential surface deformations.

18. The computer program product of claim 16, wherein the instructions for execution cause the computer processor to:
 capture, via motion sensors, gesture pattern data representing gesture motions by the person wearing the e-textile clothing garment that are generated subsequent to the manipulating the deformable fabric thread components to generate the representation of the drawn line pattern as the linear series of sequential surface deformations; and
 determine whether the person recognized message content associated to the drawn line pattern as a function of matching the captured gesture pattern data to a gesture pattern labeled within a trained data set of gesture patterns.

19. The computer program product of claim 18, wherein the instructions for execution cause the computer processor to:
 learn optimal proportionate values for the force exerted by the surface deformations upon the skin surface, and for the tracing velocity, as a function of association to historic gesture pattern responses by the person that are determined to indicate that the person recognized the message content associated to the drawn line pattern.

20. The computer program product of claim 19, wherein the instructions for execution cause the computer processor to:
  learn different optimal proportionate values for the force exerted by the surface deformations upon the skin surface at different locations of the deformable fabric thread components of an e-textile clothing garment that are correlated to different portions of the body of the person wearing the e-textile clothing garment.

* * * * *